United States Patent [19]

Iovine et al.

[11] 4,305,860

[45] Dec. 15, 1981

[54] STABLE, PUMPABLE, SOLVENT-FREE COLLOIDAL POLYAMPHOLYTE LATICES, THEIR PREPARATION AND USE IN PAPER

[75] Inventors: Carmine P. Iovine; Dilip K. Ray-Chaudhuri, both of Bridgewater, N.J.

[73] Assignee: National Starch and Chemical Corporation, Bridgewater, N.J.

[21] Appl. No.: 180,214

[22] Filed: Aug. 21, 1980

[51] Int. Cl.³ ............................................. C08L 33/02
[52] U.S. Cl. .......................... 260/29.6 TA; 526/287; 526/295; 162/168 NA
[58] Field of Search ................. 260/29.6 TA, 29.7 H; 526/287, 292, 295; 162/168 NA

[56] References Cited

U.S. PATENT DOCUMENTS 3,759,982 9/1973 Samour ....................... 260/29.6 TA
3,983,166 9/1976 Samour ....................... 260/29.6 TA
4,171,418 10/1979 Barua ......................... 260/29.6 TA Primary Examiner—Paul R. Michl
Attorney, Agent, or Firm—Edwin M. Szala; Margaret B. Kelley

[57] ABSTRACT

Stable, pumpable, solvent-free polyampholyte latices characterized by their colloidal nature, as well as by a solids content of about 10 to 40% by weight and a RVF Brookfield bulk viscosity of up to 20,000 centipoises at 25° C. and 20 RPM, are prepared by polymerizing 10–30 mole % of a cationic monomer, 5–30 mole % of an anionic monomer, 15–35 mole % of a hydrophobic monomer, and 5–70 mole % of a non-ionic hydrophilic monomer. The monomer amounts are selected so as to provide a copolymer having a charge density of about 15 to 60 mole % and charge ratio of between about 0.33 and 6. The polymerization is carried out without the use of solvents. The performance of the latices as pigment retention and drainage aids is unexpectedly good.

16 Claims, No Drawings

STABLE, PUMPABLE, SOLVENT-FREE COLLOIDAL POLYAMPHOLYTE LATICES, THEIR PREPARATION AND USE IN PAPER

BACKGROUND OF THE INVENTION

This invention relates to stable, pumpable, solvent-free polyampholyte latices comprising water and an amphoteric copolymer colloidally dispersed therein. It also relates to a process for preparing these latices. It further relates to their use as paper-making aids such as retention and drainage aids.

Interest in the preparation and use of water-soluble copolymers has increased due to government regulations concerning pollution abatement. These copolymers may be non-ionic, cationic, anionic, or amphoteric, depending upon the nature of the water-soluble or water-dispersible monomers used in their preparation. They are useful in the paper, petroleum, water treatment, and mineral processing industries. However, in order to obtain performance characteristics comparable with those of water-insoluble copolymers, it is necessary to use high molecular weight copolymers, which has presented handling problems. These high molecular weight, water-soluble copolymers are currently available in four forms (i.e. solids, aqueous solutions, aqueous emulsions, and aqueous dispersions), all of which have disadvantages in the desired application areas.

Use of the solid copolymers directly is impractical and would require the use of expensive equipment for dissolution and constant proportioning. It is more efficient and practical to use aqueous solutions, which for economic reasons should have high solids contents. The preparation of such solutions from the solid copolymer is difficult, requiring excessive dissolution times since the copolymers, when added to water, form gels (i.e. water-swollen particles whose exterior portions are covered with a gelatinous water-polymer mixture which retards movement of water into the particle and reduces the particle's effectiveness in an application area). Further these high solids solutions are impractical due to their very high viscosity and the difficulty of handling (i.e. pumping) them.

Dilute aqueous solutions of high molecular weight copolymers can be prepared directly by known solution polymerization techniques, but these are also impractical to use due to their low solids content (e.g. about 5% copolymer by weight). In addition, even at these low solids contents, the solutions have a high viscosity making them also difficult to handle.

To overcome the above difficulties and to still maintain the convenience of a liquid product, the trend has been to the use of aqueous emulsions resulting from water-in-oil (W/O) heterogeneous polymerization techniques. These techniques are well-known and result in high solids, low viscosity emulsions containing the preferred high molecular weight copolymers. However, these emulsions, although pumpable, require special handling. They tend to separate into a polymer-poor oil phase and polymer-rich phase, and they are flammable due to the presence of organic solvents (e.g. toluene or paraffinic hydrocarbons) which are used to form the continuous water-insoluble (oil) phase. They have several other serious drawbacks. First, unlike the emulsions resulting from conventional emulsion polymerizations using oil-in-water emulsifiers, they contain large amounts of water-in-oil emulsifiers, typically amounting to about 10-20% by weight of the continuous phase. Second, they result in increased water pollution when used directly in application areas such as paper-making since neither the emulsifier nor solvent are retained to any significant degree. Finally, most of the emulsions require an "inversion step" after dilution.

To overcome the handling difficulties involved in the direct use of W/O aqueous emulsions, it has been suggested that aqueous dispersions containing copolymer, a low HLB surfactant, and a water-soluble organic solvent, used as a carrier, be prepared (see U.S. Pat. No. 4,176,107). These dispersions can then be rapidly dissolved in water. However, the preparation of these dispersions from the aqueous W/O emulsions involves the additional step of removing the oil phase either prior to or after addition of surfactant and carrier (typically a polyalkylene glycol). Even though this eliminates the handling difficulty due to the flammable solvent, it still suffers from serious drawbacks in that surfactant and organic solvent are present in the final solution.

All of the above difficulties and drawbacks would be obviated if stable, pumpable, high solids aqueous latices containing amphoteric copolymers could be prepared, without the use of emulsifiers or solvents, which had the performance characteristics of the above high molecular weight solution copolymers and which could be used directly without further processing.

It is an object of this invention to provide such latices, specifically polyampholyte latices useful in paper-making applications.

We have discovered that the performance characteristics of the solid high molecular weight copolymers previously discussed can be achieved with low viscosity, easily pumpable latices, which do not contain surfactants, emulsifiers or solvents, and, as such, overcome the drawbacks and disadvantages of the prior art W/O emulsion and solution copolymers. These latices, which are true colloids even in dilute solution, demonstrate unexpectedly good performance characteristics in view of the traditional thinking that colloidal copolymers do not perform as well as their solution counterparts in wet end applications. By proper design of the latex copolymer with respect to monomer composition, as well as charge density and charge ratio, however, high molecular weight, low viscosity products with excellent performance characteristics can be obtained.

SUMMARY OF THE INVENTION

The above object is achieved by the preparation of stable, pumpable, solvent-free polyampholyte latices characterized by their colloidal nature and their high solids content and low bulk viscosity. The latices are prepared by polymerizing cationic, anionic, hydrophobic, and non-ionic hydrophilic monomers in the presence of water and a free-radical initiator and optionally a chelating agent. The amounts of monomers used are selected so as to provide a copolymer having a characteristic charge density and charge ratio. The performance of the latices as pigment retention and drainage aids is unexpectedly good.

DESCRIPTION OF THE PREFERRED EMBODIMENTS

As used herein, the term "latices" refers to colloidal dispersions of a solid copolymer in water, which dispersions are prepared without the use of a solvent and which retain their colloidal nature on dilution. The term "solvent" refers to both hydrophobic and hydrophilic organic solvents. The term "emulsifier" refers to the aids commonly used in formulating W/O emulsions and includes surfactants and dispersants. The term "paper" includes sheet-like masses and molded products made from fibrous cellulosic materials which may be derived from natural sources as well as from synthetics such as polyamides, polyesters, and polyacrylic resins, and from mineral fibers such as asbestos and glass. In addition, papers made from combinations of cellulosic and synthetic materials are applicable herein. Paperboard is also included within the broad term "paper".

Monomer Selection

The colloidal amphoteric copolymers dispersed in the aqueous latices of this invention are derived from about 10-30 mole % of at least one cationic monomer, 5-30 mole % of at least one anionic monomer, 15-35 mole % of at least one hydrophobic monomer, and 5-70 mole % of at least one non-ionic hydrophilic monomer, with the monomer percentages totaling 100 mole %. This copolymer design provides the required charge density of 15-60 mole %, preferably 20-55%, and required cationic to anionic charge ratio between about 0.33 and 6, preferably 0.5 and 3, and contributes to their colloidal nature and their performance characteristics.

The charge density is defined as the sum of the mole percentages of all the cationic and anionic monomers. The charge ratio is defined as the quotient obtained by dividing the total mole percentage of all the cationic monomers by the total mole percentage of all the anionic monomers.

Typical monomers are as follows:

Cationic—dimethyldiallylammonium chloride, diethyldiallylammonium chloride, 2-acrylamido-2-methylpropyltrimethylammonium chloride, 2-methacryloxy-2-ethyltrimethylammonium chloride, 2-methacryloxy-2-hydroxypropyltrimethylammonium methosulfate, trimethylmethacryloxyethylammonium methosulfate, acrylamidopropyltrimethylammonium chloride, vinylbenzyltrimethylammonium chloride, and the like.
Anionic—(meth)acrylic acid, 2-sulfoethyl methacrylate, sodium styrene sulfonate, 2-acrylamido-2-methylpropane sulfonic acid, and the like.
Hydrophobic—$C_1$-$C_{12}$-alkyl(meth)acrylates, styrene, $C_4$-$C_8$-alkyl substituted acrylamides, and the like.
Hydrophilic (non-ionic)—(N,N-dimethyl)acrylamide, hydroxyethyl(meth)acrylate, hydroxypropyl(meth)acrylate, and the like.

Latex Preparation

The latices are prepared by polymerizing the selected monomers in the presence of water using known solution polymerization techniques. The latices are characterized by both a high active solids content, typically about 10 to 40% by weight, and a low bulk viscosity, typically a RVF Brookfield viscosity of up to 20,000 cps at 25° C. and 20 RPM. Preferably the solids content is about 15-25% and viscosity about 1500 to 5000 cps. It is not necessary to use a solvent and/or an emulsifier in the preparation of these latices.

The polymerization may be carried out at 30°-100° C. under atmospheric, subatmospheric, or superatmospheric conditions in the presence of a free-radical initiator. Any free radical initiator may be used, such as inorganic peroxides or their combination with reducing agents (i.e. redox initiators) or potassium or ammonium persulfates. Other mechanisms of initiation such as ionizing radiation or thermal means may be used. The use of certain polymerization aids such as chelating agents is optional, but preferred with certain cationic monomers (e.g. dialkyldiallylammonium halides).

A typical polymerization is carried out by charging an aqueous mixture containing all or part of the cationic monomer and 10-15% of the anionic, hydrophobic, and hydrophilic monomers to an agitated polymerization vessel. The concentration of monomers at this stage is about 20-40%, preferably 40%. All or part of the initiator is also charged, as well as any chelating agent that may be used. The system is deoxygenated, preferably with nitrogen, and heated to about 30°-100° C., preferably 50°-75° C., the temperature used depending upon the initiator selected. After polymerization is initiated, as evidenced by the colloidal (milky) nature of the initial charge, the remaining aqueous monomer mixtures are slowly and simultaneously added over 1-3 hours. After a suitable holding time, typically 2-3 hours, the latex is discharged and is ready for direct use, optionally after further dilution with water.

The practitioner will recognize that the contents of the initial charge and the time over which the comonomers are introduced will depend on the homopolymerization vs. copolymerization rates of the various comonomers and may be varied to achieve the characteristic copolymers and latices of this invention.

Latex Use

The latices herein may be used as wet end additives and in any other applications wherein such polyampholyte latices are commonly used. They are particularly useful as pigment retention and drainage aids in the manufacture of paper. They are used mainly as beater additives, although their addition to the wet pulp may occur at any point in the paper-making process prior to the ultimate conversion of the pulp into a dry web or sheet. Thus, for example, they may be added to the pulp while the latter is in the headbox, beater, hydropulper, or stock chest.

The latices herein may be effectively used for addition to pulp prepared from any types of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical chemi-ground wood, ground wood, or any combination of these fibers. Fibers of the viscous rayon or regenerated cellulose type may also be used if desired.

Any desired inert mineral fillers may be added to the pulp which is to be modified with the latices herein. Such materials include clay, titanium dioxide, talc, calcium carbonate, calcium sulfate, and diatomaceous earths. Rosin or synthetic internal size may also be present, if desired.

The proportion of the colloidal amphoteric copolymer to be incorporated into the paper pulp may vary in accordance with the particular pulp involved. Preferably the latices are diluted with additional water to assure better dispersion in the wet pulp. In general, it is preferred to add the latices in volumetric amounts sufficient to provide from about 0.01 to 1 weight % of copolymer, based on dry weight of the pulp, preferably 0.03 to 0.1% for use as a pigment retention aid and 0.1 to 0.5% for use as a drainage aid. Within this preferred range the precise amount which is used will depend upon the type of pulp being used, the specific operating conditions, and the particular end use for which the paper is intended. The use of copolymer amounts greater than 1% is not precluded, but is ordinarily unnecessary in order to achieve the desired improvements. When added in the proper concentrations, the latices herein serve to increase pigment retention and improve drainage while maintaining the resistance of the finished sheet to folding, picking, and scuffing.

It can also be appreciated by the practitioner that a large number of variations may be effected in the selection of monomers, initiators, and chelating agents and in the preparation and use procedures described above without materially departing from the scope and spirit of the invention. Such variations will be apparent to those skilled in the art and are to be included within the scope of this invention.

The following examples will more fully illustrate the embodiments of this invention. In the examples, all parts and percentages are given by weight and all temperatures are in degrees Celsius, unless otherwise noted. RVF Brookfield viscosities were determined at 25° C. and 20 RPM; intrinsic viscosities were determined at 25° C. in 1 N potassium chloride.

EXAMPLE I

This example describes the preparation of a typical latex.

Latex I—Dimethyldiallylammonium Chloride/Acrylic Acid/n-Butyl-Acrylate/Acrylamide Copolymer (18/6/20/56 mole %)

An initial charge of 44.1 parts of a 66% aqueous solution of dimethyldiallylammonium chloride, 0.3 part acrylic acid, 3 parts n-butyl acrylate, 2.0 parts acrylamide, 0.01 part ammonium persulfate, 0.029 part tetrasodium ethylenediamine tetraacetic acid, and 33.9 parts water was added to a 1 liter four-necked flask fitted with a condenser, stirrer, thermometer, suitably sized equalized addition funnels, and a means for vacuum deoxygenating and repressurizing. The system was alternately deoxygenated to 12 mm Hg and repressurized to 0.5 psi with nitrogen several times and finally left under a positive nitrogen pressure. It was heated to 65°–70° C., and once polymerization was initiated the following charges were simultaneously and slowly added over a 3 hr period:

Charge A—37.8 parts acrylamide and 4.0 parts acrylic acid in 171.2 parts water
Charge B—0.045 part ammonium persulfate in 75 parts water
Charge C—23 parts n-butyl acrylate The system was heated for an additional 2 hrs to maintain the temperature at 65°–70° C., diluted with 265 parts water, cooled, and discharged. The resulting colloidal free-flowing latex was characterized by a solids content of 15%, Brookfield viscosity of 5000 cps, and intrinsic viscosity of 2.0 dl/g. Conversion was 95%. The copolymer had a charge density and charge ratio of 24 mole % and 3, respectively.

EXAMPLE II

Part A

This example describes the preparation of colloidal latices containing copolymers derived from other cationic, anionic, hydrophobic, and non-ionic hydrophilic monomers. The preparation processes were similar to that of Example I. The charges used are described below. The latices and copolymers are characterized in Table I.

Latex II-A - Dimethyldiallylammonium Chloride/Acrylic Acid/t-Octyl Acrylamide/Acrylamide Copolymer (30/24/15/31 mole %)

| Components | Parts | Addition Time |
|---|---|---|
| DMDAAC solution[1] (62.5%) | 77.6 | |
| Tetrasodium EDTA[2] | 0.049 | |
| Ammonium persulfate | 0.03 | Initial charge |
| Deionized water | 60.6 | |
| t-Octyl acrylamide | 27.5 | |
| Acrylic acid | 17.3 | Add 10% to initial charge |
| Acrylamide | 22.0 | Add 90% over 4 hrs |
| Deionized water | 10.0 | |
| Ammonium persulfate | 0.115 | Add over 4 hrs |
| Deionized water | 169.8 | |
| Deionized water | 337.0 | Add as final diluent |

[1] Dimethyldiallylammonium chloride in water
[2] Tetrasodium ethylenediamine tetraacetic acid
Reaction temperature was 68–70° C.; total reaction time was 4 hrs.

Latex II-B-1 - Dimethyldiallylammonium Chloride/Acrylic Acid/n-Butyl Acrylate/Acrylamide Copolymer (15/12/25/48 mole %)

| Components | Parts | Addition Time |
|---|---|---|
| DMDAAC solution (60%) | 37.0 | |
| Acrylic acid | 0.5 | |
| n-Butyl acrylate | 3.2 | |
| Acrylamide | 1.7 | Initial charge |
| Tetrasodium EDTA | 0.024 | |
| Ammonium persulfate | 0.198 | |
| Deionized water | 29.6 | |
| Acrylamide | 32.4 | |
| Acrylic acid | 8.2 | Add over 3 hrs |
| Deionized water | 277.5 | |
| Ammonium persulfate | 0.100 | Add over 3 hrs |
| Deionized water | 75.0 | |
| n-Butyl acrylate | 28.8 | Add over 3 hrs |

Reaction temperature was 68–70° C.; total reaction time was 5 hrs.

Latex II-B-2 - Dimethyldiallylammonium Chloride/Acrylic Acid/n-Butyl Acrylate/Acrylamide Copolymer (15/15/25/45 mole %)

| Components | Parts | Addition Time |
|---|---|---|
| DMDAAC solution (66%) | 36.7 | Initial charge |
| Acrylic acid | 1.0 | |
| n-Butyl acrylate | 3.2 | |
| Tetrasodium EDTA | 0.024 | |
| Ammonium persulfate | 0.25 | |
| Deionized water | 32.9 | |
| n-Butyl acrylate | 28.8 | Add over 3 hrs |
| Acrylic acid | 28.7 | Add over 3 hrs |
| Acrylamide | 9.8 | |
| Deionized water | 274.8 | |
| Ammonium persulfate | 0.20 | Add over 3 hrs |
| Deionized water | 75.0 | |

Reaction temperature was 67–68° C.; total reaction time was 3 hrs.

Latex II-B-3 - Dimethyldiallylammonium Chloride/Acrylic Acid/n-Butyl Acrylate/Acrylamide Copolymer (20/16/25/39 mole %)

| Components | Parts | Addition Time |
|---|---|---|
| DMDAAC solution (66%) | 49.0 | Initial charge |
| Acrylic acid | 0.6 | |
| n-Butyl acrylate | 3.2 | |
| Acrylamide | 1.4 | |
| Tetrasodium EDTA | 0.032 | |
| Ammonium persulfate | 0.100 | |
| Deionized water | 39.8 | |

-continued

Latex II-B-3 - Dimethyldiallylammonium Chloride/Acrylic Acid/n-Butyl Acrylate/Acrylamide Copolymer (20/16/25/39 mole %)

| Components | Parts | Addition Time |
|---|---|---|
| Acrylic acid | 11.0 | Add slowly over 2.5 hrs |
| Acrylamide | 26.3 | |
| Deionized water | 282.2 | |
| Ammonium persulfate | 0.100 | Add slowly over 3 hrs |
| Deionized water | 75.0 | |
| n-Butyl acrylate | 28.8 | Add slowly over 2.5 hrs |

Reaction temperature was 67–70° C.; total reaction time was 5.5 hrs.

Latex II-C - Dimethyldiallylammonium Chloride/Acrylic Acid/Methyl Acrylate/Hydroxypropyl Acrylate Copolymers (30/12/18/40 mole %)

| Components | Parts | Addition Time |
|---|---|---|
| DMDAAC solution (61%) | 79.4 | Initial charge |
| Acrylic acid | 0.9 | |
| Methyl acrylate | 1.6 | |
| Hydroxypropyl acrylate | 5.2 | |
| Tetrasodium EDTA | 0.048 | |
| Ammonium persulfate | 0.125 | |
| Deionized water | 162.0 | |
| Acrylic acid | 7.7 | Add over 1.5 hrs |
| Methyl acrylate | 13.9 | |
| Hydroxypropyl acrylate | 46.8 | |
| Deionized water | 110.0 | Add as final diluent |

Reaction temperature was 65–70° C.; total reaction time was 4.5 hrs.

Latex II-D - Dimethyldiallylammonium Chloride/Acrylic Acid/Methyl Acrylate/Acrylamide Copolymer (30/24/31/15 mole %)

| Components | Parts | Addition Time |
|---|---|---|
| DMDAAC solution (62.5%) | 77.6 | Initial charge |
| Tetrasodium EDTA | 0.048 | |
| Ammonium persulfate | 0.155 | |
| Deionized water | 39.1 | |
| Acrylic acid | 17.3 | Add 10% slowly to Initial charge |
| Methyl acrylate | 26.7 | Add 90% over 4 hrs |
| Acrylamide | 10.7 | |
| Deionized water | 10.0 | |
| Ammonium persulfate | 0.103 | Add over 4 hrs |
| Deionized water | 220.0 | |
| Deionized water | 232.7 | Add as final diluent |

Reaction temperature was 67–73° C.; total reaction time was 6 hrs.

Latex II-E - Trimethylmethacryloxyethylammonium Methosulfate/Sulfatoethyl Methacrylate/n-Butyl Acrylate/Acrylamide Copolymer (10/20/35/35 mole %)

| Components | Parts | Addition Time |
|---|---|---|
| TMMEAM solution (80%)[1] | 3.54 | Initial charge |
| Sodium sulfoethylmethacrylate | 4.32 | |
| n-Butyl acrylate | 3.84 | |
| Acrylamide | 2.49 | |
| t-Butyl hydroperoxide (70%)[2] | 0.29 | |
| Deionized water | 31.0 | |
| TMMEAM solution (80%) | 31.84 | Add over 3.5 hrs[3] |
| Sodium sulfoethylmethacrylate | 38.88 | |
| Acrylamide | 22.41 | |
| Deionized water | 425.0 | |
| Sodium formaldehyde sulfoxylate | 0.30 | Add in 3 ml increments every 10 min over 3.75 hrs |
| Deionized water | 75.0 | |

-continued

Latex II-E - Trimethylmethacryloxyethylammonium Methosulfate/Sulfatoethyl Methacrylate/n-Butyl Acrylate/Acrylamide Copolymer (10/20/35/35 mole %)

| Components | Parts | Addition Time |
|---|---|---|
| n-Butyl acrylate | 40.9 | Add over 3.5 hrs[3] |

[1]Trimethylmethacryloxyethylammonium methosulfate in water
[2]Aqueous solution
[3]After addition of the 1st increment of sodium formaldehyde sulfoxylate Reaction temperatures were 50° C. initially, 55–60° C. during the additions, and 75° C. for 1 hr after completion of the additions. Total reaction time was 3.75 hrs.

Part B

This example describes the preparation of a colloidal latex containing a copolymer which will be characterized by a charge density of 21 and a charge ratio of 6. The preparation process will be similar to that of Example I. The charges to be used are described below.

Latex II-B-4 - Dimethyldiallylammonium Chloride/Acrylic Acid/n-Butyl Acrylate/Acrylamide Copolymer (18/3/25/54 mole %)

| Components | Parts | Addition Time |
|---|---|---|
| DMDAAC solution (66%) | 44.1 | Initial charge |
| Acrylic acid | 0.2 | |
| n-Butyl acrylate | 3.2 | |
| Acrylamide | 3.8 | |
| Tetrasodium EDTA | 0.029 | |
| Potassium persulfate | 0.15 | |
| Deionized water | 36.0 | |
| Acrylic Acid | 2.0 | Add over 3 hrs |
| Acrylamide | 34.5 | |
| Deionized water | 302.5 | |
| Butyl acrylate | 28.8 | Add over 3 hrs |
| Potassium persulfate | 0.15 | Add over 3 hrs |
| Deionized water | 57.0 | |

Reaction temperature should be between about 65 and 75° C.; total reaction time should be about 3–5 hrs.

EXAMPLE III

This example is a comparative example illustrating the preparation of a typical water-in-oil emulsion copolymer.

W/O Emulsion Copolymer—Dimethyldiallylammonium Chloride/Acrylic Acid/Acrylamide

An initial charge of 37 parts of a 66% aqueous solution of dimethyldiallylammonium chloride, 3.6 parts acrylic acid, 56.8 parts acrylamide, 0.024 part tetrasodium ethylenediamine tetraacetic acid, 0.085 part ammonium persulfate, and 130 parts water was added to a 500 ml round bottom flask equipped with a stirrer, thermometer, and condenser with a vacuum deoxygenating and repressurizing means. Agitation was begun and, after the components dissolved, a solution of 14 parts polyoxyethylene (20) sorbitan tristearate (Tween 65*) and 100 ml of Isopar E* (*trade names of Atlas Chemical Co. and Exxon respectively) was added. The transparent system separated into two phases if the agitation was stopped. It was alternately deoxygenated and repressurized with nitrogen and then heated to 65°–70° C. to effect polymerization. With the initiation of polymerization the reaction became exothermic and cooling was required to maintain the temperature at a maximum of 70° C. As the polymerization proceeded the system took on the appearance of an emulsion. After the exotherm the emulsion was heated for an additional 2 hrs at 65°–70° C.

The resulting emulsion is characterized in Table I and compared with the latices of Example II, Part A.

TABLE I

| | Latex Characterization | | | Copolymer Characterization | |
|---|---|---|---|---|---|
| Designation | Solids (weight %) | Brookfield Viscosity (cps) | Intrinsic Viscosity (dl/g) | Charge Density | Cationic/Anionic Charge Ratio |
| I | 15.0 | 5,000 | 2.00 | 24 | 3.0 |
| II-A | 16.2 | 5,300 | 1.80 | 54 | 1.25 |
| II-B-1 | 20.3 | 8,500 | 1.46 | 27 | 1.25 |
| II-B-2 | 20.5 | 4,450 | 1.37 | 30 | 1.0 |
| II-B-3 | 18.2 | 13,000 | 1.80 | 36 | 1.25 |
| II-C | 29.6 | 6,200 | 1.03 | 42 | 2.5 |
| II-D | 16.6 | 4,100 | 1.60 | 54 | 1.25 |
| II-E | 19.0 | 25 | 0.21 | 30 | 0.5 |
| W/O Emulsion (comparative) | 28.5 | Gel | 5.12* | — | — |

*Determined on the precipitated emulsifier-free copolymer

EXAMPLE IV

This example demonstrates the effectiveness of the colloidal latices of this invention as pigment retention and drainage aids for paper stocks.

Part A—Use as Pigment Retention Aids

Four of the latices prepared above were diluted with distilled water to 0.5% concentrations by simple hand mixing of the bulk latex with water. The diluted latices retained their colloidal nature. They were then added at a concentration of 0.03% by weight, based on the dry pulp, to a bleached softwood pulp beaten to 600 Canadian Standard Freeness. The pulp also contained 4 and 11% paper alum (aluminum sulfate) by weight, based on the weight of the dry pulp, and 10% titanium dioxide by weight, based on the weight of the pulp and alum.

Pigment retention values for test paper stocks and those for the comparative samples were determined by first preparing hand made paper sheets on the Williams Standard Sheet Mold and then testing for the percentage of titanium dioxide retained by the method described in TAPPI Standard #T413 m.58.

One comparative sample contained a commercial high molecular weight solid polyacrylamide type pigment retention aid. The other contained the W/O emulsion copolymer of Example III—a high molecular weight emulsion copolymer of acrylamide, which is a pigment retention aid representative of the emulsions of the prior art which contain solvent and emulsifier. The pigment retention of a blank which contained no pigment retention aid was also determined. The results are given in Table II.

TABLE II

| | TiO₂ Retention (%) | |
|---|---|---|
| Material Tested | at 4% Alum | at 11% Alum |
| Blank | 44.0 | 49.0 |
| Latex I | 65.2 | 67.2 |
| Latex II-A | 68.6 | 72.5 |
| Latex II-B-1 | 68.5 | 68.8 |
| Latex II-B-2 | 63.4 | 61.0 |
| W/O Emulsion Acrylamide Copolymer (comparative) | 65.7 | 70.0 |
| Solid Polyacrylamide (comparative) | 64.9 | 59.5 |

The results show that the latices of this invention performed as well as their solution counterparts, a surprising result in view of the traditional thinking that colloidal polymers do not perform as well in wet-end applications.

Part B—Use as Drainage Aid

Two of the latices prepared above and a similarly prepared latex were diluted with distilled water to 0.1% concentrations and then added at concentrations of 0.2 and 0.4% by weight, based on dry pulp, to a bleached softwood pulp beaten to 600 Canadian Standard Freeness and having a pH of 5.5. The pulp was mixed for 30 sec, added to a modified Britt jar (Dynamics Drainage Jar) containing 1550 ml water, and mixed for 10–15 secs; the plug was then pulled, the sample was allowed to drain to the 1500 ml mark, and the time required for 1200 ml to drain to the 300 ml mark was recorded. The drainage of a blank which contained no drainage aid was also determined.

The drain times and percentage improvement are recorded in Table III. Lower drain times mean better drainage.

TABLE III

| | Drainage Data | | | |
|---|---|---|---|---|
| | 0.2% Addition | | 0.4% Addition | |
| Material Tested | Time (sec) | Improvement (%) | Time (sec) | Improvement (%) |
| Latex II-B-1 | 18.0 | 38 | 15.0 | 48 |
| Latex II-B-3 | 19.0 | 35 | 16.7 | 43 |
| Latex II-B-5* | 14.8 | 49 | 12.8 | 60 |

*Dimethyldiallylammonium Chloride/Acrylic Acid/n-Butyl Acrylate/Acrylamide Copolymer (15/12/20/53 mole %) - 21% solids, 11,000 cps viscosity, 27 mole % charge density, and 1.25 charge ratio.

EXAMPLE V

This example demonstrates the bulk viscosity advantage of the colloidal latices of this invention over solutions containing the high performance copolymers of the prior art. Brookfield viscosities were determined on two of the latices of this invention at 5, 10, and 20% solids by weight and compared with the viscosities of the prior art copolymers, namely the solid polyacrylamide and W/O emulsion acrylamide copolymer (see Examples III and IV), at the same concentrations. The results are shown in Table IV.

TABLE IV

| | Viscosity (cps) | | |
|---|---|---|---|
| Material Tested | 5% solids | 10% solids | 20% solids |
| Latex II-B-1 | 90 | 350 | 8,000 |
| Latex II-B-3 | 250 | 900 | 10,000 |
| Solid Polyacrylamide | 250,000 | Gel | Gel |

TABLE IV-continued

| | Viscosity (cps) | | |
|---|---|---|---|
| Material Tested | 5% solids | 10% solids | 20% solids |
| (comparative) W/O Emulsion Acrylamide Copolymer (comparative) | 50,000 | 225,000 | Gel |

Summarizing, this invention is seen to provide stable, pumpable solvent-free polyampholyte latices comprising water and specially designed amphoteric copolymers colloidally dispersed therein.

Now that the preferred embodiments of the present invention have been described in detail, various modification and improvements thereon will become readily apparent to those skilled in the art. Accordingly, the spirit and scope of the invention are to limited only by the appended claims and not be the foregoing specification.

What is claimed is:

1. A stable, pumpable, solvent-free polyampholyte latex, characterized by a solids content of about 10 to 40% by weight and a RVF Brookfield bulk viscosity of up to 20,000 centipoises at 25° C. and 20 RPM, which comprises water and an amphoteric copolymer colloidally dispersed therein, said copolymer characterized by a charge density of 15 to 60 mole % and a cationic to anionic molar charge ratio between about 0.33 and 6 and derived from:
   a. at least one cationic monomer present in a total amount from about 10 to 30 mole %;
   b. at least one anionic monomer present in a total amount from about 5 to 30 mole %;
   c. at least one hydrophobic monomer present in a total amount from about 15 to 35 mole %; and
   d. at least one non-ionic hydrophilic monomer present in a total amount from about 5 to 70 mole %, said monomer percentages totaling 100 mole %.

2. The latex of claim 1, wherein said latex has a solids content of about 15-25% and a bulk viscosity of about 1500 to 5000 centipoises.

3. The latex of claim 1, wherein said copolymer is characterized by a charge density of about 20 to 55 mole % and a charge ratio between about 0.5 and 3; said cationic monomer is dimethyldiallylammonium chloride, diethyldiallylammonium chloride, 2-acrylamido-2-methylpropyltrimethylammonium chloride, 2-methacryloxy-2-ethyltrimethylammonium chloride, 2-methacryloxy-2-hydroxypropyltrimethylammonium methosulfate, trimethylmethacryloxyethylammonium methosulfate, acrylamidopropyltrimethylammonium chloride, or vinylbenzyltrimethylammonium chloride, said anionic monomer is acrylic acid, methacrylic acid, 2-sulfoethyl methacrylate, sodium styrene sulfonate, or 2-acrylamido-2-methylpropane sulfonic acid; said hydrophobic monomer is a $C_1$-$C_{12}$-alkyl acrylate, a $C_1$-$C_{12}$-alkyl methacrylate, styrene, or a $C_4$-$C_8$-alkyl N-substituted acrylamide; and said non-ionic hydrophilic monomer is acrylamide, N,N-dimethyl acrylamide, hydroxyethyl acrylate, hydroxypropyl acrylate, hydroxyethyl methacrylate, or hydroxypropyl methacrylate.

4. The latex of claim 1, wherein said latex has a solids content of about 15 to 30% by weight and a bulk viscosity of about 25 to 13,000 centipoises and said copolymer is derived from 15-20 mole % dimethyldiallylammonium chloride, 6-16 mole % acrylic acid, 20-25 mole % n-butyl acrylate, and 39-56 mole % acrylamide; or from 30 mole % dimethyldiallylammonium chloride, 24 mole % acrylic acid, 15 mole % t-octyl acrylamide, and 31 mole % acrylamide; or from 30 mole % dimethyldiallylammonium chloride, 12 mole % acrylic acid, 18 mole % methyl acrylate, and 40 mole % hydroxypropyl acrylate; or from 30 mole % dimethyldiallylammonium chloride, 24 mole % acrylic acid, 31 mole % methyl acrylate, and 15 mole % acrylamide; or from 10 mole % trimethylmethacryloxyethylammonium methosulfate, 20 mole % sulfatoethyl methacrylate, 35 mole % n-butyl acrylate, and 35 mole % acrylamide.

5. The latex of claim 1, wherein the copolymer derived from dimethyldiallylammonium chloride, acrylic acid, n-butyl acrylate, and acrylamide is characterized by a charge density of about 24 to 36 mole % and a charge ratio between 1.25 and 3.

6. The process for preparing the latex of claim 1, which comprises the step of polymerizing said monomers at 30° to 100° C. in the presence of water and a free-radical initiator and optionally a chelating agent.

7. The process for preparing the latex of claim 4, which comprises the step of polymerizing said monomrs at 50° to 75° C. in the presence of water and, as a free radical initiator, ammonium persulfate or a mixture of sodium formaldehyde sulfoxylate and t-butyl hydroperoxide.

8. A stable, pumpable, solvent-free polyampholyte latex comprising water and an amphoteric copolymer colloidally dispersed therein, said latex characterized by a solids content of about 10 to 40% by weight and a RVF Brookfield bulk viscosity of up to 20,000 centipoises at 25° C. and at 20 RPM and said copolymer characterized by a total charge density of about 15 to 60 mole % and a cationic to anionic molar charge ratio between about 0.33 and 6, said latex prepared by a process comprising the step of polymerizing at 30° to 100° C., in the presence of water and a free radical initiator and optionally a chelating agent, about 10 to 30 mole % of at least one cationic monomer, about 5 to 30 mole % of at least one anionic monomer, about 15 to 35 mole % of at least one hydrophobic monomer, and about 5 to 70 mole % of at least one non-ionic hydrophilic monomer, said monomer percentages totaling 100 mole %.

9. The latex of claim 8, wherein said copolymer is characterized by a charge density of about 20 to 55 mole % and a charge ratio between 0.5 and 3; said cationic monomer is dimethyldiallylammonium chloride, diethyldiallylammonium chloride, 2-acrylamido-2-methylpropyltrimethylammonium chloride, 2-methacryloxy-2-ethyltrimethylammonium chloride, 2-methacryloxy-2-hydroxypropyltrimethylammonium methosulfate, trimethylmethacryloxyethylammonium methosulfate, acrylamidopropyltrimethylammonium chloride, or vinylbenzyltrimethylammonium chloride, said anionic monomer is acrylic acid, methacrylic acid, 2-sulfoethyl methacrylate, sodium styrene sulfonate, or 2-acrylamido-2-methylpropane sulfonic acid; said hydrophobic monomer is a $C_1$-$C_{12}$-alkyl acrylate, a $C_1$-$C_{12}$-alkyl methacrylate, styrene, or a $C_4$-$C_8$-alkyl N-substituted acrylamide; and said non-ionic hydrophilic monomer is acrylamide, N,N-dimethyl acrylamide, hydroxyethyl acrylate, hydroxypropyl acrylate, hydroxyethyl methacrylate, or hydroxypropyl methacrylate.

10. The latex of claim 8, wherein said latex has a solids content of about 15 to 30% by weight and a bulk viscosity of about 25 to 13,000 centipoises at 25° C. and said copolymer is derived from 15-20 mole % dimethyldiallylammonium chloride, 6–16 mole % acrylic acid, 20–25 mole % n-butyl acrylate, and 39–56 mole % acrylamide; or from 30 mole % dimethyldiallylammonium chloride, 24 mole % acrylic acid, 15 mole % t-octyl acrylamide, and 31 mole % acrylamide; or from 30 mole % dimethyldiallylammonium chloride, 12 mole % acrylic acid, 18 mole % methyl acrylate, and 40 mole % hydroxypropyl acrylate; or from 30 mole % dimethyldiallylammonium chloride, 24 mole % acrylic acid, 31 mole % methyl acrylate, and 15 mole % acrylamide; or from 10 mole % trimethylmethacryloxyethylammonium methosulfate, 20 mole % sulfatoethyl methacrylate, 35 mole % n-butyl acrylate, and 35 mole % acrylamide; and said polymerization step is carried out at 50°–75° C. in the presence of ammonium persulfate or a mixture of sodium formaldehyde sulfoxylate and t-butyl peroxide as a free radical initiator.

11. In a method for making paper, the step which comprises adding, as a paper-making aid, to the paper-making pulp at any stage prior to forming a web, a stable, pumpable, solvent-free polyampholyte latex characterized, before any optional dilution thereof, by a solids content of about 10 to 40% by weight and a RVF Brookfield bulk viscosity of up to 20,000 centipoises at 25° C. and 20 RPM, said latex comprising water and an amphoteric copolymer colloidally dispersed therein, said copolymer characterized by a total charge density of 15 to 60 mole % and a cationic to anionic molar charge ratio between about 0.33 and 6 and derived from at least one cationic monomer present in a total amount from about 10 to 30 mole %, at least one anionic monomer present in a total amount from about 5 to 30 mole %, at least one hydrophobic monomer present in a total amount from about 15 to 35 mole %, and at least one non-ionic hydrophilic monomer present in a total amount from about 5 to 70 mole %, said monomer percentages totaling 100 mole %; said latex being added in an amount sufficient to make said paper containing from about 0.01 to 1% by weight of said copolymer, based on said dry pulp.

12. In the method of claim 11, wherein said paper-making aid is a pigment retention aid, said latex is added in an amount sufficient to make said paper containing from about 0.03 to 0.1% by weight of said copolymer, based on said dry pulp.

13. In the method of claim 11, wherein said paper-making aid is a drainage aid, said latex is added in an amount sufficient to make said paper containing from about 0.1 to 0.5% by weight of said copolymer, based on said dry pulp.

14. In the method of claim 12 or 13, wherein said copolymer is characterized by a charge density of about 20 to 55 mole % and a charge ratio between about 0.5 and 3; said cationic monomer is dimethyldiallylammonium chloride, diethyldiallylammonium chloride, 2-acrylamido-2-methylpropyltrimethylammonium chloride, 2-methacryloxy-2-ethyltrimethylammonium chloride, 2-methacryloxy-2-hydroxypropyltrimethylammonium methosulfate, trimethylmethacryloxyethylammonium methosulfate, acrylamidopropyltrimethylammonium chloride, or vinylbenzyltrimethylammonium chloride, said anionic monomer is acrylic acid, methacrylic acid, 2-sulfoethyl methacrylate, sodium styrene sulfonate, or 2-acrylamido-2-methylpropane sulfonic acid, said hydrophobic monomer is a $C_1$–$C_{12}$-alkyl N-substituted acrylamide, hydroxyethyl acrylate, hydroxypropyl acrylate, hydroxyethyl methacrylate, or hydroxypropyl methacrylate.

15. In the method of claim 12 or 13, wherein said latex is characterized by a solids content of 15–30% by weight and a bulk viscosity of 25 to 13,000 centipoises at 25° C. and said copolymer is derived from 15–20 mole % dimethyldiallylammonium chloride, 6–16 mole % acrylic acid, 20–25 mole % n-butyl acrylate, and 39–56 mole % acrylamide; or from 30 mole % dimethyldiallylammonium chloride, 24 mole % acrylic acid, 15 mole % t-octyl acrylamide, and 31 mole % acrylamide; or from 30 mole % dimethyldiallylammonium chloride, 12 mole % acrylic acid, 18 mole % methyl acrylate, and 40 mole % hydroxypropyl acrylate; or from 30 mole % dimethyldiallylammonium chloride, 24 mole % acrylic acid, 31 mole % methyl acrylate, and 15 mole % acrylamide; or from 10 mole % trimethylmethacryloxyethylammonium methosulfate, 20 mole % sulfatoethyl methacrylate, 35 mole % n-butyl acrylate, and 35 mole % acrylamide.

16. In the method of claim 15, wherein said copolymer derived from dimethyldiallylammonium chloride, acrylic acid, n-butyl acrylate, and acrylamide is characterized by a charge density of about 24 to 36 mole % and a charge ratio between about 1.25 and 3.

* * * * *